US010776468B2

(12) United States Patent
Baughman et al.

(10) Patent No.: US 10,776,468 B2
(45) Date of Patent: *Sep. 15, 2020

(54) SYSTEM AND METHOD FOR REAL WORLD BIOMETRIC ANALYTICS THROUGH THE USE OF A MULTIMODAL BIOMETRIC ANALYTIC WALLET

(71) Applicant: Daedalus Blue LLC, Bronxville, NY (US)

(72) Inventors: Aaron K. Baughman, Silver Spring, MD (US); Christopher J. Dawson, Arlington, VA (US); Barry M. Graham, Silver Spring, MD (US); David J. Kamalsky, San Jose, CA (US)

(73) Assignee: Daedalus Blue LLC, Bronxville, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 15/995,816

(22) Filed: Jun. 1, 2018

(65) Prior Publication Data
US 2018/0276362 A1 Sep. 27, 2018

Related U.S. Application Data

(63) Continuation of application No. 14/811,960, filed on Jul. 29, 2015, now Pat. No. 10,013,541, which is a (Continued)

(51) Int. Cl.
G06F 21/62 (2013.01)
G06F 21/32 (2013.01)

(52) U.S. Cl.
CPC .......... G06F 21/32 (2013.01); G06F 21/6245 (2013.01)

(58) Field of Classification Search
CPC ................. G06F 21/32; G06F 21/6245; G06F 2221/2141; H04L 63/0861; H04L 9/3231; H04L 63/101; H04W 12/06; H04W 12/08
See application file for complete search history.

(56) References Cited

U.S. PATENT DOCUMENTS 6,219,639 B1  4/2001  Bakis et al.
6,356,941 B1 *  3/2002  Cohen ................. G06F 21/6272
                                               709/219

(Continued)

FOREIGN PATENT DOCUMENTS

WO   9708898   3/1997

OTHER PUBLICATIONS

Alsulaiman et al., "A Noval 3D Graphical Password Schema", 2006 IEEE Conference on Virtual Environments, Human-Computer Interfaces and Measurement Systems, Jun. 10-12, 2006, pp. 125-128.

(Continued)

Primary Examiner — Ali S Abyaneh
(74) Attorney, Agent, or Firm — Kinney & Lange, P.A.

(57) ABSTRACT

A system and method for real world biometric analytics through the use of a multimodal analytic wallet. The system includes a biometric wallet comprising a pervasive repository for storing biometric data, the pervasive repository including at least one of a biometric layer, a genomic layer, a health layer, a privacy layer, and a processing layer. The biometric wallet further comprises a biometric analytic interface configured to communicate the biometric data to one or more devices.

9 Claims, 6 Drawing Sheets

Related U.S. Application Data continuation of application No. 13/833,240, filed on Mar. 15, 2013, now Pat. No. 9,147,060, which is a continuation of application No. 12/196,703, filed on Aug. 22, 2008, now Pat. No. 8,448,230.

(56) References Cited

U.S. PATENT DOCUMENTS

| | | | |
|---|---|---|---|
| 6,545,682 B1 | 4/2003 | Ventrella et al. | |
| 6,898,299 B1* | 5/2005 | Brooks | G06K 9/00 340/5.52 |
| 6,945,870 B2 | 9/2005 | Gatto et al. | |
| 6,970,582 B2* | 11/2005 | Langley | G06K 9/00006 340/5.53 |
| 7,013,365 B2* | 3/2006 | Arnouse | G06K 7/10079 711/115 |
| 7,120,607 B2* | 10/2006 | Bolle | G06F 21/32 705/64 |
| 7,310,042 B2* | 12/2007 | Seifert | G05B 19/0425 340/5.53 |
| 7,360,689 B2 | 4/2008 | Beenau et al. | |
| 7,487,089 B2* | 2/2009 | Mozer | G06F 21/32 382/116 |
| 7,490,048 B2* | 2/2009 | Joao | G06F 19/328 705/3 |
| 7,894,849 B2* | 2/2011 | Kass | A61B 5/0002 455/550.1 |
| 7,941,324 B1* | 5/2011 | Sholtis | G06Q 50/22 705/2 |
| 8,132,236 B2 | 3/2012 | Hawkins et al. | |
| 2002/0095389 A1 | 7/2002 | Gaines | |
| 2003/0046237 A1* | 3/2003 | Uberti | G06Q 20/02 705/44 |
| 2005/0221798 A1* | 10/2005 | Sengupta | H04M 1/67 455/411 |
| 2006/0173715 A1* | 8/2006 | Wang | A61B 5/0002 705/2 |
| 2006/0271791 A1 | 11/2006 | Novack et al. | |
| 2006/0293925 A1* | 12/2006 | Flom | G06F 21/32 705/3 |
| 2007/0047770 A1* | 3/2007 | Swope | A61B 5/1171 382/115 |
| 2007/0124589 A1* | 5/2007 | Sutton | G06F 21/32 713/169 |
| 2008/0015418 A1 | 1/2008 | Jarrell et al. | |
| 2008/0067242 A1 | 3/2008 | Bonalle et al. | |
| 2008/0071545 A1 | 3/2008 | Novack et al. | |
| 2008/0104415 A1* | 5/2008 | Palti-Wasserman | G06F 21/32 713/186 |
| 2008/0148059 A1* | 6/2008 | Shapiro | G06F 21/32 713/186 |
| 2008/0177576 A1* | 7/2008 | Jennings | G06Q 10/10 705/3 |
| 2008/0222706 A1* | 9/2008 | Renaud | H04L 63/1408 726/4 |
| 2009/0029769 A1 | 1/2009 | Muller | |
| 2009/0228952 A1* | 9/2009 | Gillig | G06F 21/6218 726/1 |
| 2009/0300525 A1 | 12/2009 | Jolliff | |
| 2009/0309891 A1 | 12/2009 | Karkanias et al. | |
| 2011/0002461 A1* | 1/2011 | Erhart | H04L 9/3249 380/44 |

OTHER PUBLICATIONS

Wolf et al., "Multimedia Content Representation Classification and Security", Article entitled: "Study of Applicability of Virtual Users in Evaluating Multimodal Biometrics", Lecture notes on Computer Science, vol. 4105, Sep. 11-13, 2006, pp. 554-561.

Rejman-Greene, "Biometrics—Real Indetities dor a Virtual World", BT Technology Journal, vol. 19, No. 3, 2001, pp. 115-121.

Mhatre et al., "Biometric Technology for Human Identification II", Article entitled: "Efficient Search and Retrieval in Biometric Databases", Proceedings of the SPIE, v SPIE-5779, Mar. 28-29, 2005, pp. 265-273.

Ross, "Information Fusion in Biometrics", Pattern Recognition Letters 24, 2003, pp. 2115-2125.

Anonymous, "Evolutionary Facial Feature Selection", GECCO'08, Jul. 12-16, 2008, 6 pages.

"Biometrics Foundation Documents", http://biometricscatalog.org/ NSTCSubcommittee, date and author Unknown.

Collins, "Studies in Artificial Evolution" 1992, pp. 1-170.

* cited by examiner

SYSTEM AND METHOD FOR REAL WORLD BIOMETRIC ANALYTICS THROUGH THE USE OF A MULTIMODAL BIOMETRIC ANALYTIC WALLET

FIELD OF THE INVENTION

The invention generally relates to a system and method for using biometric data and, in particular, to a system and method for real world biometric analytics through the use of a multimodal analytic wallet.

BACKGROUND

A number of technologies have been developed in response to the increased need for secured transactions, communications, and data storage. One such technology is biometrics. Biometrics is a technology for uniquely recognizing humans based upon one or more intrinsic physical, cognitive, or behavioral traits. Exemplary biometrics may include fingerprints, facial patterns, iris patterns, deoxyribonucleic acid (DNA), voice recognition, etc.

For example, a fingerprint can be scanned using a biometric system, such as a biometric sensor, and the uniqueness of the fingerprint can be determined by analyzing the patterns of ridges and furrows that occur on the scanned fingerprint. Authentication of the fingerprint can be performed manually by a human or electronically by comparing any number of the fingerprint patterns to existing fingerprint data until a match occurs. Thereby, allowing an individual to be personally identified by his or her physical traits.

Similarly, an iris scan may be used to personally identify an individual. Iris recognition may be performed, e.g., using camera technologies with infrared illumination to reduce specular reflection from the individual's convex cornea. This allows for a detailed image of the iris, which may be converted into a digital template and used to personally identify an individual by his or her physical traits.

SUMMARY

In a first aspect of the invention, a system includes a biometric wallet comprising a pervasive repository for storing biometric data, the pervasive repository including at least one of a biometric layer, a genomic layer, a health layer, a privacy layer, and a processing layer. The biometric wallet further comprises a biometric analytic interface configured to communicate the biometric data to one or more devices.

In another aspect of the invention, a computer implemented method for using biometric data comprises accessing biometric data via an acquisition device and processing the biometric data. The computer implemented method further comprises storing the biometric data in a biometric wallet and communicating the biometric data to one or more devices via a biometric analytic interface.

In another aspect of the invention, a computer program product comprising a computer usable storage medium having readable program code embodied in the storage medium is provided. The computer program product includes at least one component operable to: sense biometric data comprising at least one of physiological biometric data, behavioral biometric data, and cognitive biometric data; and store the biometric data in a pervasive repository having at least one of a biometric layer, a genomic layer, a health layer, a privacy layer, and a processing layer.

In yet another aspect of the invention, a method for communicating biometric data comprises providing a computer infrastructure being operable to: check a user defined privacy policy; obtain the biometric data from a user; store the biometric data in a pervasive repository; and communicate the biometric data to one or more devices via a biometric analytic interface.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
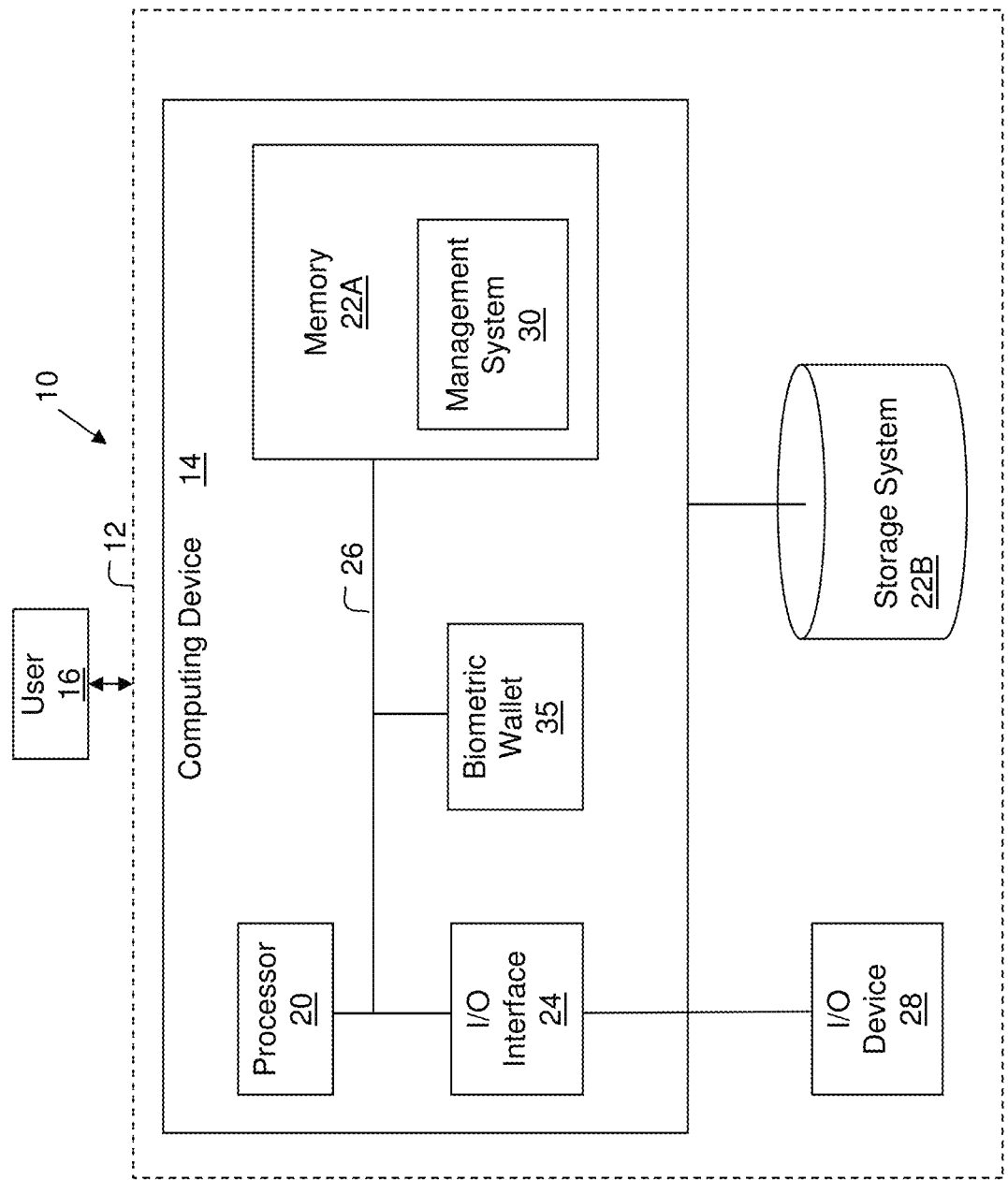
FIG. 1 shows an illustrative environment for implementing the steps in accordance with the invention.

The invention is directed to a system and method for using biometric data and, in particular, to a system and method for real world biometric analytics through the use of a multimodal analytic wallet. More specifically, the invention utilizes a multimodal biometric analytic wallet ("biometric wallet") for gathering, storing, and communicating biometric information. The biometric wallet comprises a pervasive repository and one or more biometric analytic interfaces.

There are multiple systems that may be used to acquire biometric data from a user. For example, unimodal biometric systems may be used to acquire a single biometric characteristic, such as a fingerprint, for authentication. However, unimodal systems are unable to combine other biometric analytic data for user authentication.

Multimodal biometric systems may also be used to acquire biometric data from a user. Unlike unimodal systems, multimodal biometric systems attempt to integrate traditional and behavioral biometric characteristics for user authentication. Existing multimodal biometric systems include statically defined biometric acquisition points, fusion policies, and computational algorithms for user authentication. However, existing multimodal systems do not combine multimodal information and do not include other types of information such as the human genome, health data, and family history.

Manual health data systems may also be used to acquire biometric data from one or more devices. Exemplary devices may include magnetic resonance imaging (MRI) and functional MRI (FMRI) as well as devices such as a stethoscope. However, manual health data systems fail to provide an amorphous service oriented architecture to combine multimodal information. Moreover, there is no way to use the acquired health data for user verification or authentication.

The present invention allows biometric data to be acquired from a user via any one or more of the above noted devices or from any number of additional devices known to those of skill in the art. Once acquired, the biometric wallet is configured to store disparate biometric information on a pervasive storage device or repository that can be used to, e.g., authenticate users.

The pervasive repository may store a plurality of different types of biometric information. For example, the pervasive repository may include a storage layer for a user's biometric data, genomic data, and health data. The biometric data may include physiological, behavioral, and/or cognitive biometric information. The genomic data may include DNA information about the user and the health layer may include, e.g., family information and medical history.

In embodiments, the pervasive repository may also include a privacy layer which provides mechanisms to protect biometric data from being acquired from remote sensing. The pervasive repository may also include a processing layer configured to provide perpetual biometric analytic processing and data mining for health analysis, behavioral predictions, physiological monitoring, and environment cues. In embodiments, the processing layer may be configured to verify that the data in the biometric wallet is from the user in possession of the biometric wallet. The processing layer may also be used to determine and track the user's location using, e.g., a global positioning system (GPS). These layers make it possible for the pervasive repository to support disparate biometric analytic acquisition with the potential for multi-modal rollup.

In addition to a pervasive repository the biometric wallet may also comprise a biometric analytic interface, which enables the transportation and analysis of real time on body information to one or more devices. In particular, the biometric analytic interface allows the information stored in the pervasive repository to be sensed by one or more acquisition devices. In embodiments, the acquisition devices may include remote sensors that act as service points for the biometric wallet.

The biometric analytic interface may also be used to transfer biometric data to a central computer configured to act on data stored in the pervasive repository. In embodiments, the central computer may utilize one or more analytic algorithms to link user characteristics and behavioral traits within the user's biometric wallet.

Accordingly, the present invention beneficially allows disparate biometric information to be stored on a pervasive storage device and used to authenticate users. The invention also beneficially provides mechanisms for combining genomic, health, and biometric data as well as deriving a user's cognitive state. Moreover, the invention further provides mechanisms for transferring biometric information to one or more acquisition devices.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or the computer-usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a Biometric Wallet 35, which makes computing device 14 operable to acquire, process, and transmit biometric data in accordance with the invention, e.g., process described herein.

The computing device 14 also includes a processor 20, a memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link.

The external I/O device/resource 28 may be keyboards, displays, pointing devices, microphones, headsets, etc.

In general, the processor 20 executes computer program code, which is stored in the memory 22A and/or storage system 22B. The computer code may be representative of the functionality of the Biometric Wallet 35. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Pervasive Repository

The biometric wallet comprises a pervasive repository, which is configured to store physiological, behavioral, and cognitive traits and characteristics with health data and a subject's genome. In embodiments, one or more distributed sub-instances of the pervasive repository may be created, thereby making the pervasive repository inherently distributed. The distributed sub-instances may be created based on determined privacy policies, which may be loaded onto extensible items with biometric analytic interfaces. For example, a biometric analytic interface may include a privacy policy that designates what information another biometric analytic interface or acquisition device may obtain. The pervasive repository and/or one or more distributed sub-instances of the pervasive repository may be embodied as a storage unit 22B.

Figure 2:
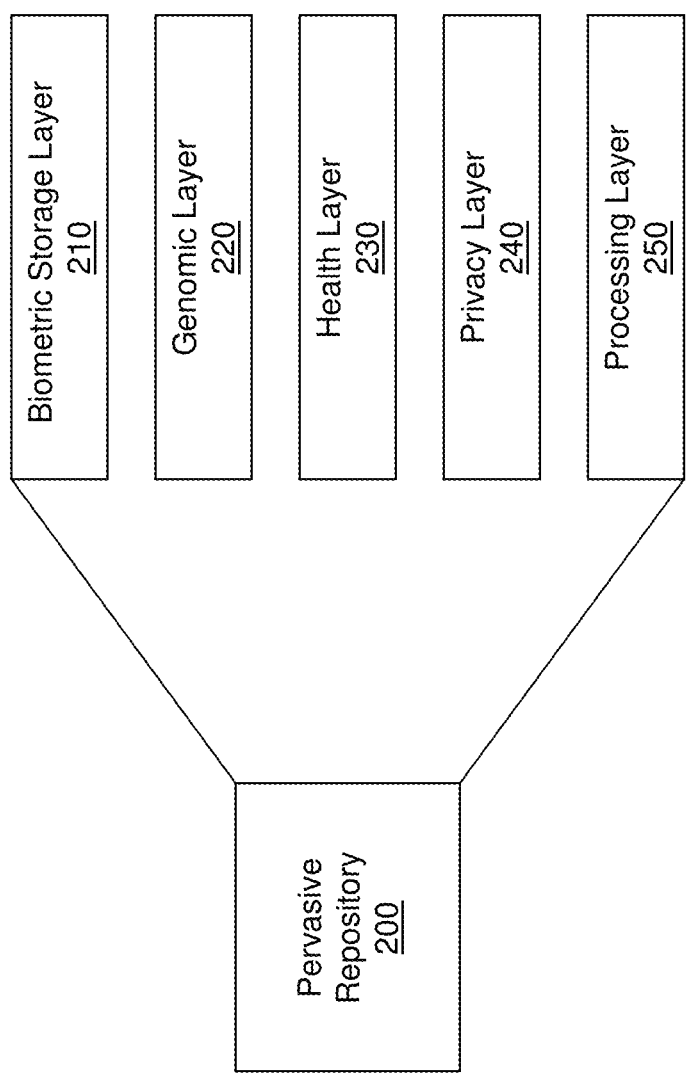
FIG. 2 shows a pervasive repository comprising five layers according to aspects of the invention.

FIG. 2 shows a pervasive repository comprising five layers in accordance with embodiments of the invention. The five layers of the pervasive repository 200 include a biometric storage layer 210, a genomic layer 220, a health layer 230, a privacy layer 240, and a processing layer 250. While five layers are disclosed herein, it should be understood by those skilled in the art that the present invention is not limited to five layers and may be expanded to include additional layers as appropriate.

Figure 3:
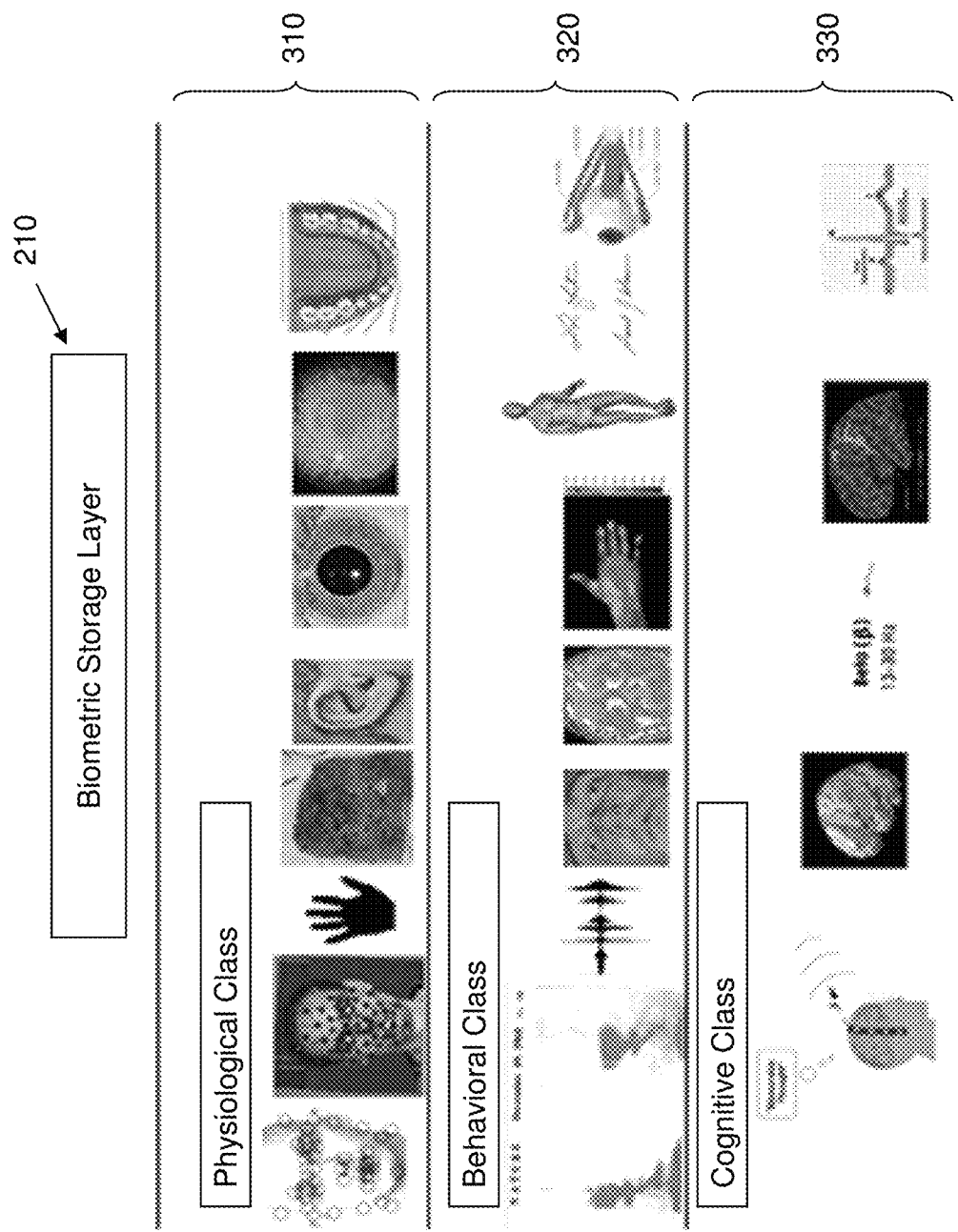
FIG. 3 shows a biometric storage layer according to aspects of the invention.

FIG. 3 shows a biometric storage layer in accordance with embodiments of the invention. The biometric storage layer 210 may be used to store information acquired from a person's body and may include trigger points for health monitoring. In embodiments, the information can be divided into three classes or layers of biometric information including physiological 310, behavioral 320, and cognitive 330 information.

The physiological layer 310 may include biometrics relating to a person's physical characteristics. These characteristics may include the person's face, hand geometry, fingers, ear/pina, iris, retina and/or teeth, etc. In embodiments, additional physiological information may also be obtained and stored in the physiological layer 310 or in a user defined field. An exemplary user defined field may be illustrated in accordance with aspects of the Federal Bureau of Investigation's Electronic Fingerprint Transmission Specification (EFTS).

The behavioral layer 320 may include biometrics relating to the person's actions and/or conduct. For example, the behavioral layer 320 may include characteristics relating to a person's voice such as vocal tract encoding and/or voice spectral information. The behavioral layer 320 may also include biometrics relating to skin luminescence, thermograms, venule/arteriole/vein/artery blood flow, signature, eye movement, and/or gait, etc.

The cognitive layer 330 may include biometrics relating to a person's thinking, learning, perception, awareness, and/or judgment. For example, the cognitive layer 330 may provide a storage mechanism for thought patterns, Purkinje fiber activations, functional magnetic resonance imaging (fMRI) under labeled movements and thoughts, limb control brain mapping, and/or electrocardiogram (ECG) recordings with respect to thought and movement, etc.

Figure 4:
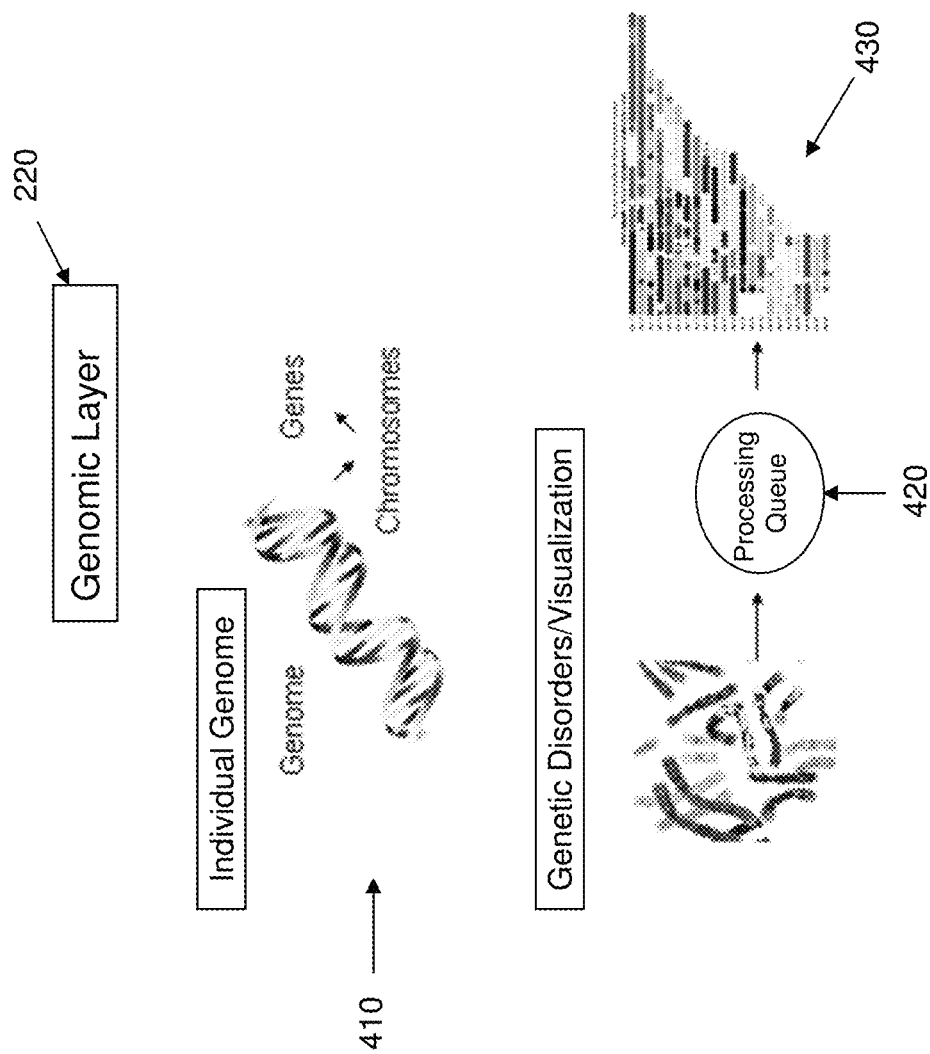
FIG. 4 shows a genomic layer according to aspects of the invention.

FIG. 4 shows a genomic layer in accordance with embodiments of the invention. The genomic layer 220 is configured to maintain a list of one or more genetic disorders. In embodiments, these genetic disorders may be synched with a distributed genetic disorder database.

In particular, the genomic layer 220 may store information about the biometric wallet owner's genome 410, genes, and/or chromosomes. A genome 410 is the complete genetic sequence of an organism, which is stored on a chromosome. A chromosome consists of a DNA helix on which thousands of genes are encoded. Each gene corresponds to a unit of inheritance, which may be associated with regulatory regions, transcribed regions, and/or other functional sequence regions.

The genomic layer 220 may process the owner's genomic sequence. In embodiments, this processing may be performed using a processing queue 420, which may keep a line of patterns 430. These patterns 430 may be searched and compared with known genetic disorders to determine whether the owner has a possible genetic risks and/or disorders. The genetic disorders may be maintained by the genomic layer 220 and synched with a distributed genetic disorder database.

Thus, the genomic layer 220 stores an individual's genome 410 and processes it to determine genetic disorders. The patterns 430 from the genetic disorders may be continually or periodically searched using one or more search algorithms. If a probable match is found, the resulting nucleotide matches may be stored for data retrieval.

Figure 5:
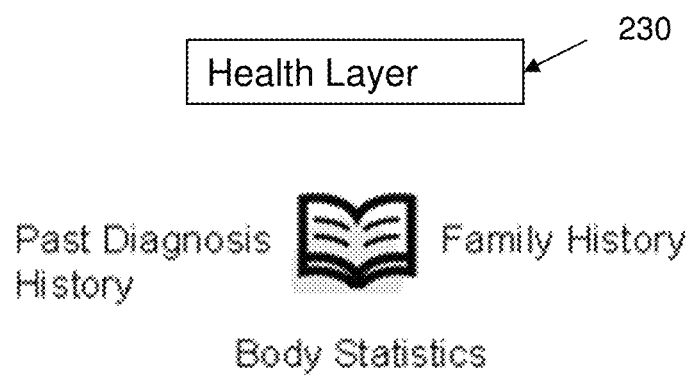
FIG. 5 shows a health layer according to aspects of the invention.

FIG. 5 shows a health layer in accordance with embodiments of the invention. The health layer 230 is configured to provide knowledge that may be correlated with the person's health state and risk factors. The health layer 230 may include the person's diagnosis history, family records, hereditary diseases, current health status, bodily statistics, and/or regional epidemiology factors. In embodiments, one or more of these factors may be used to provide predictive health monitoring and suggestions via a biometric analytic interface.

For example, the health layer 230 may maintain knowledge as to the last time the person was sick and recent symptoms the person has had. This information may be compared to the person's family records and/or the person's hereditary diseases to determine possible ailments that may be inflicting the person. The possible ailments may be acquired by a health care professional via an acquisition device and used to diagnose the person.

Figure 6:
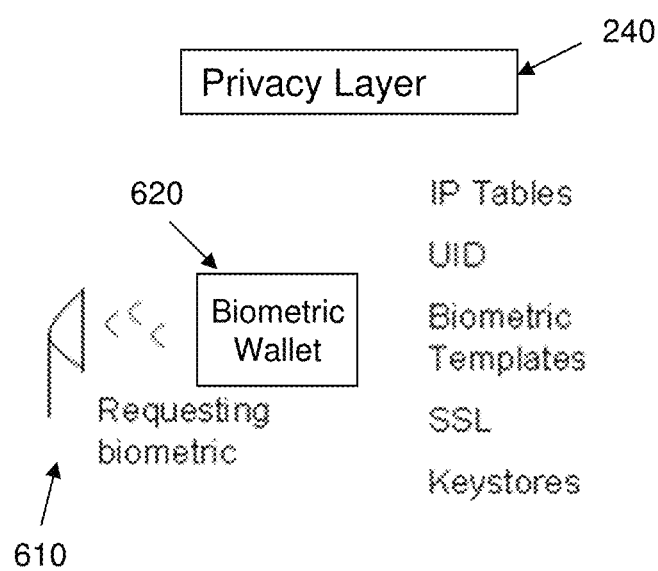
FIG. 6 shows a privacy layer according to aspects of the invention.

FIG. 6 shows a privacy layer in accordance with embodiments of the invention. The privacy layer 240 is configured to protect personal data and enable multi-layer security so that only authenticated individuals or automated systems 610 are granted access to the information stored in the user's biometric wallet 620. Thus, for example, a person's hereditary diseases may only be accessible to the user and the user's physician.

A variety of methods may be used to ensure data privacy. For example, the privacy layer 240 may employ any number of cancelable biometric technologies, which perform a distortion on one or more biometric images or features before authenticating the user. The distortion may be performed using a non-invertible biometric template stored within the biometric storage layer. In embodiments, any number of variable parameters may be utilized to provide the non-invertible function.

The privacy layer 240 may include additional types of data protection. For example, the privacy layer may include keystores, which provide certificates signed by certificate authorities for a public key infrastructure (PKI). Moreover, the privacy layer 240 may use secure socket layers (SSL) and encryption capabilities to protect the user's biometric data from public interception and/or packet snooping. Additional exemplary data protections may include, e.g., internet protocol tables, user identifiers (UID), internet protocol filtering, and/or access control lists and encryption, etc.

The processing layer 250 is configured to provide perpetual biometric analytic processing and data mining for health analysis, behavioral predictions, physiological monitoring, and environment cues. This analytic processing may be perpetual or periodic.

In particular, the processing layer 250 may be configured to verify that the data in the biometric wallet is from the user in possession of the biometric wallet. In embodiments, this may be performed by periodically comparing the user's biometric information to the biometric information stored in the biometric wallet. Alternatively, this verification may also be performed by having the user periodically re-verify himself or herself by entering a code, password, biometric information, etc., into the biometric wallet. The re-verification may be required when the biometric wallet exceeds a predefined distance from the user or a predefined period of time has elapsed. In embodiments, the user may be notified of the need to re-verify himself or herself via a vocal prompt from the biometric wallet, a physical alert such as a vibration, etc.

The processing layer 250 may also be used to determine and track locational and environmental information. For example, the processing layer 250 may be used to determine and/or track a user's location, the speed in which the user is moving at any given time, etc., using a global positioning system (GPS) or similar device. The processing layer 250 may also include one or more sensors to determine the temperature, amount of moisture in the air, barometric pressure, etc. This information may be stored in the pervasive repository and, in embodiments, may be accessed by the user via the biometric analytic interface.

In embodiments, the traits, characteristics, and data in the pervasive repository may be synched to a central computer or repository via the biometric analytic interface. For example, as a user with a biometric wallet moves in and out of range of the central computer repository, both may be synched. The range within which the synching occurs may be dynamically defined and may relate to a geographical distance such as inches, feet, yards, meters, and/or miles, etc. The range may also relate to, e.g., the distance in which a person may be heard while shouting, talking, and/or whispering. Moreover, in embodiments, the range may be related to an event that influences when and/or how frequently biometric information can be obtained from the biometric wallet's biometric analytic interface.

Biometric Analytic Interface

Biometric analytic interfaces are ubiquitous interfaces configured to provide service points to acquisition devices, traveling repositories, and analytic environments. In essence, biometric analytic interfaces may be embodied as amorphous service oriented architectures. One or more biometric analytic interfaces may be included in any number of real world items including clothing, accessories, digital and mechanical devices, as well as any other extensible item. For example, biometric analytic interfaces may be included in cards, phones, sweaters, shoes, eye glasses, etc. The biometric analytic interfaces are configured to provide mechanisms for parallel acquisition and processing as well as to provide a mechanism to synch to a central computer or repository, which may perform algorithms to combine disparate biometric data. The central repository may be embodied as a storage unit 22B.

For example, a user with a biometric wallet may be shopping at a store and come into contact with an acquisition device, such as a biometric analytic interface. Depending on the user's privacy settings, the acquisition device may obtain biometric information about the user, such as a user's response to a product, via the user's biometric analytic interface. The acquisition device may use this information to, e.g., determine that the user's heart rate is increasing while looking at the product. The acquisition device, or a processing device associated with the acquisition device, can associate the increased heart rate with the user being interested in the product. In embodiments, this information may be used to, e.g., offer the user a coupon for the product, recommend similar products to the user, provide an audio interface or prompt to describe the product, etc.

While information associated with a user's biometric wallet is configured to be transferable, it should be understood that limits may be placed on the transferability of any one or more pieces of information within the biometric wallet. Such transferability may be limited, e.g., by a user's privacy policy. However, in embodiments, an acquisition device may obtain information from a user via one or more sensor that are unrelated to the user's biometric wallet. For example, an acquisition device may include an optic interface, which allows the user's response to be monitored without accessing the user's biometric wallet. These acquisitions may or may not be approved by the user prior to the acquisition.

In embodiments, the biometric analytic interface may be connected to a computer via a docking station or other mechanism configured to send data to a computing device. For example, a user may connect his or her biometric wallet to a computing device after coming home from a day of shopping. Once connected, the user may be able to see where he or she went, what responses he or she had throughout out the day, the temperature at various points of the day, and/or the biometric information obtained about the user throughout the day, etc. In embodiments, the user may also see what acquisition devices attempted to obtain information about the user via the biometric analytic interface. The user may adjust the privacy settings in the biometric analytic interface to allow one or more of these acquisition device access to some or all of the user's biometric data the next time the user comes within a predefined distance of the acquisition devices.

Figure 7:
FIG. 7 shows an exemplary biometric analytic interface knowledge representation according to aspects of the invention.

FIG. 7 shows an exemplary biometric analytic interface knowledge representation in accordance with embodiments of the invention. In particular, FIG. 7 includes a biometric analytic interface type, in column 700. The type of biometric analytic interface may include, e.g., a person's watch, a store kiosk, a physician, etc.

FIG. 7 also includes an activation column 710, which identifies the range the biometric analytic interface should be from an acquisition device, such as another biometric analytic interface, a central repository, etc. In embodiments, the range may be in inches, feet, yards, meters, and/or miles, etc. Optionally, the range may relate to, e.g., the distance in which a person may be heard while shouting, talking, and/or whispering. While a range is indicated in activation column 710, it should be understood by those skilled in the art that any number of mechanisms and/or events may be used to determine when and/or how frequently biometric information can be obtained from the biometric wallet's biometric analytic interface.

An output column 720 and an input column 730 may also be included as part of the biometric analytic interface. The output column 720 may represent the knowledge sent from the biometric analytic interface to the acquisition device. The input column 730 may represent information that may be sent to, e.g., a central repository.

For example, Type 1 may be representative of a having a biometric analytic interface. The biometric analytic interface may acquire and process information obtained from a user within a 0.9 meter activation range of the kiosk. The biometric analytic interface may also send information about the user as output. The amount and/or type of information sent as output may depend on the biometric analytic interface's privacy policy, as defined by the user. In embodiments, an input may be used to send information to one or more algorithms, communication rules, etc., which may be included in a central repository.

Examples of Use

In embodiments, the biometric wallet may be used for heath monitoring. For example, a user can walk to a health monitoring kiosk, which requests permission to acquire biometric information from the user using an infrared camera. Upon authorization, the kiosk may acquire a thermogram of the user and transmit the data to the users biometric wallet and/or to a central repository for storage and processing. Using this thermogram image, real time temperature informatics may be derived about the user.

Another illustrative example may include an acquisition device in a home system, which receives permission from the user via the user's biometric wallet to acquire a skin luminance image of the user. This image may be transmitted to the biometric wallet or to a central repository where algorithms may be applied to the luminance image. If the user is sweaty, as contrasted to a baseline image from previously obtained data, the biometric wallet can send a signal to decrease the room temperature using the biometric analytic interface. In embodiments, the sensors in the acquisition device may update the information to determine if the user becomes too cold or remains sweaty, thereby allowing the temperature to be continuously adjusted to the user's comfort.

In yet a further example, a number of athletes in a sporting event may have analytic wallets in their uniforms. During coverage of the event, physiological and/or behavioral acquisition devices such as odor and gait devices may solicit permission to acquire data from the athletes. After agreement, the data may be transmitted to a central repository for processing and delivered back to the biometric wallet, coaches, a team doctor, and/or a sports center desk, etc. This information may be used to provide an extra dimension of analysis and, e.g., allow coaches to determine which players need a break from the event.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A biometric system, comprising:
   a computer readable hardware storage device;
   a biometric analytic interface configured to communicate biometric data to one or more acquisition devices, wherein:
   the biometric analytic interface includes privacy settings,
   the biometric analytic interface is configured to use the privacy settings to determine a portion of the biometric data that is allowed to be accessed by the one or more acquisition devices,
   the biometric data maintained in the computer readable hardware storage device,
   the biometric analytic interface is configured to receive an adjustment to the privacy settings that changes the portion of the biometric data that is allowed to be accessed by the one or more acquisition devices during a subsequent attempt to obtain the biometric data, and
   wherein the portion of the biometric data that is allowed to be accessed by the one or more acquisition devices in a subsequent attempt to obtain the biometric data is determined using the adjustment to the privacy settings.

2. The biometric system of claim 1, wherein the biometric analytic interface is further configured to notify a user which acquisition devices attempt to obtain the biometric data.

3. The biometric system of claim 2, wherein the adjustment to the privacy settings is received after the user is notified of the acquisition devices that attempt to obtain the biometric data.

4. The biometric system of claim 1, wherein the biometric data includes physiological biometric data, behavioral biometric data, and cognitive biometric data.

5. The biometric system of claim 1, wherein the biometric analytic interface provides for parallel acquisition and processing.

6. The biometric system of claim 1, wherein the biometric analytic interface includes a privacy policy.

7. The biometric system of claim 1, wherein the biometric analytic interface is configured to permit a user to adjust privacy settings of the biometric analytic interface to permit one or more of the acquisition devices to access the biometric data.

8. The biometric system of claim 1, wherein the biometric analytic interface is configured to enable transportation and analysis of real time, on body information.

9. The biometric system of claim 8, wherein the on body information includes at least one of a thermogram and a skin luminance image of the user.

* * * * *